(12) United States Patent
Merko

(10) Patent No.: US 6,280,055 B1
(45) Date of Patent: Aug. 28, 2001

(54) LIGHT MODIFIER

(75) Inventor: Andy V. Merko, Altadena, CA (US)

(73) Assignee: Andy Merko, Altadena, CA (US)

( * ) Notice: Subject to any disclaimer, the term of this patent is extended or adjusted under 35 U.S.C. 154(b) by 0 days.

(21) Appl. No.: 09/406,175

(22) Filed: Sep. 25, 1999

Related U.S. Application Data

(60) Provisional application No. 60/102,183, filed on Sep. 28, 1998.

(51) Int. Cl.$^7$ .................................................. G03B 15/02
(52) U.S. Cl. ......................... 362/235; 362/16; 362/414; 362/249; 362/322; 362/301; 362/282; 362/18
(58) Field of Search ................................. 362/249, 235, 362/247, 248, 16, 18, 351, 410, 414, 240, 431, 298, 302, 303, 305, 322, 282

(56) References Cited

U.S. PATENT DOCUMENTS

| | | |
|---|---|---|
| 4,052,607 | 10/1977 | Larson . |
| 4,504,888 | 3/1985 | Rosenthal . |
| 4,788,628 | 11/1988 | Farrall . |
| 5,519,588 | * 5/1996 | Sobeck et al. ......................... 362/240 |
| 5,950,340 | * 9/1999 | Woo ........................................ 40/564 |
| 6,106,137 | * 8/2000 | Adams et al. ......................... 362/237 |

OTHER PUBLICATIONS

"Balcar Super Diamond Box" Calumet Catalog 1999–2000 p. 54.
Light Tech Catalog Fluorescent Fill Light p. 10 p. 12.
Elinchrom Square Reflector Catalog p. 10.
Combo Light Cool–Lux Catalog p. 4.
Aura–Soft By Optex Optex Catalog p. 1–4.
Molequartz Overhead—Mole–Richardson Catalog p. 4.
Soft–Lights—Lowel Catalog p. 57.
Balcar Powerflux Calumet Catalog p. 87.
Balcar Fluorescent Fixtures Calumet Catalog p. 86.
Sinar Bron Light Banks Catalog '97 p. 49.

* cited by examiner

*Primary Examiner*—Thomas M. Sember
(74) *Attorney, Agent, or Firm*—Norton Townsley

(57) ABSTRACT

An apparatus for integrating and modifying light output of strobe-based and continuous light sources. A light-modifier housing made to accept variety of commercially available lights typically used in photography lighting. The output of these lights is channeled in a uniform way for illuminating an area or subject to be photographed. Multiple light units can be mounted onto the modifier. A light, preferably the center one, can be removed and substituted with camera for shadowless lighting effect.

With interchangeable adapter plates, different manufacturer's lights such as strobe lights or constant lights, are quickly mounted onto the modifier. Highly reflective paneling is used to line the inside surfaces as well as the inner side of the adjustable louvers (barndoors). These combination results in a system offering maximum, uniform, light output with high degree of controllability.

The light weight modifier can be mounted on user supplied studio stands or inverted from ceiling mounts. The adjustable louvers can be folded against the frame for transportation.

17 Claims, 4 Drawing Sheets

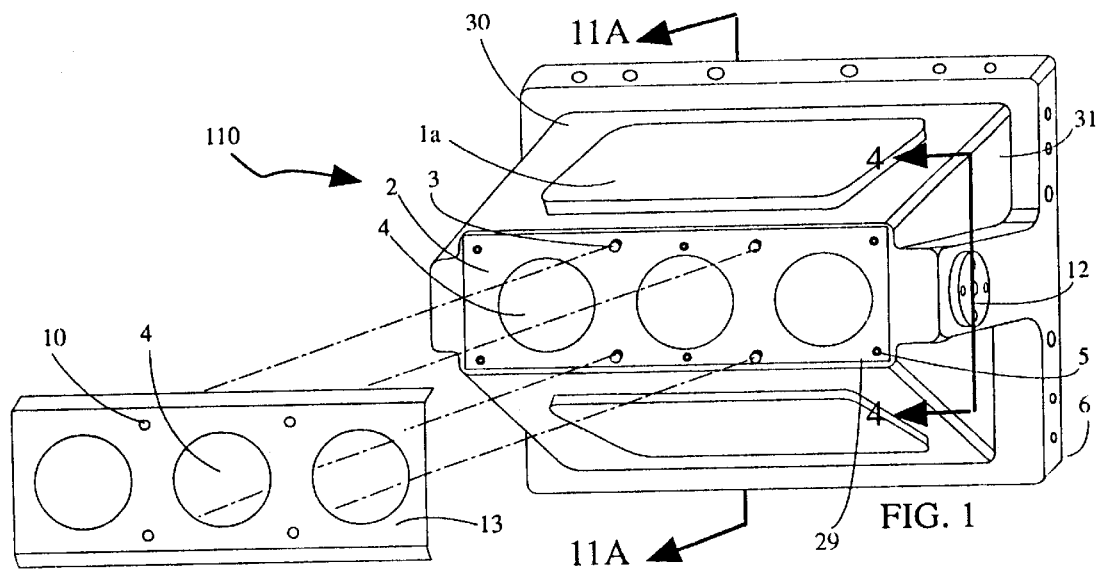
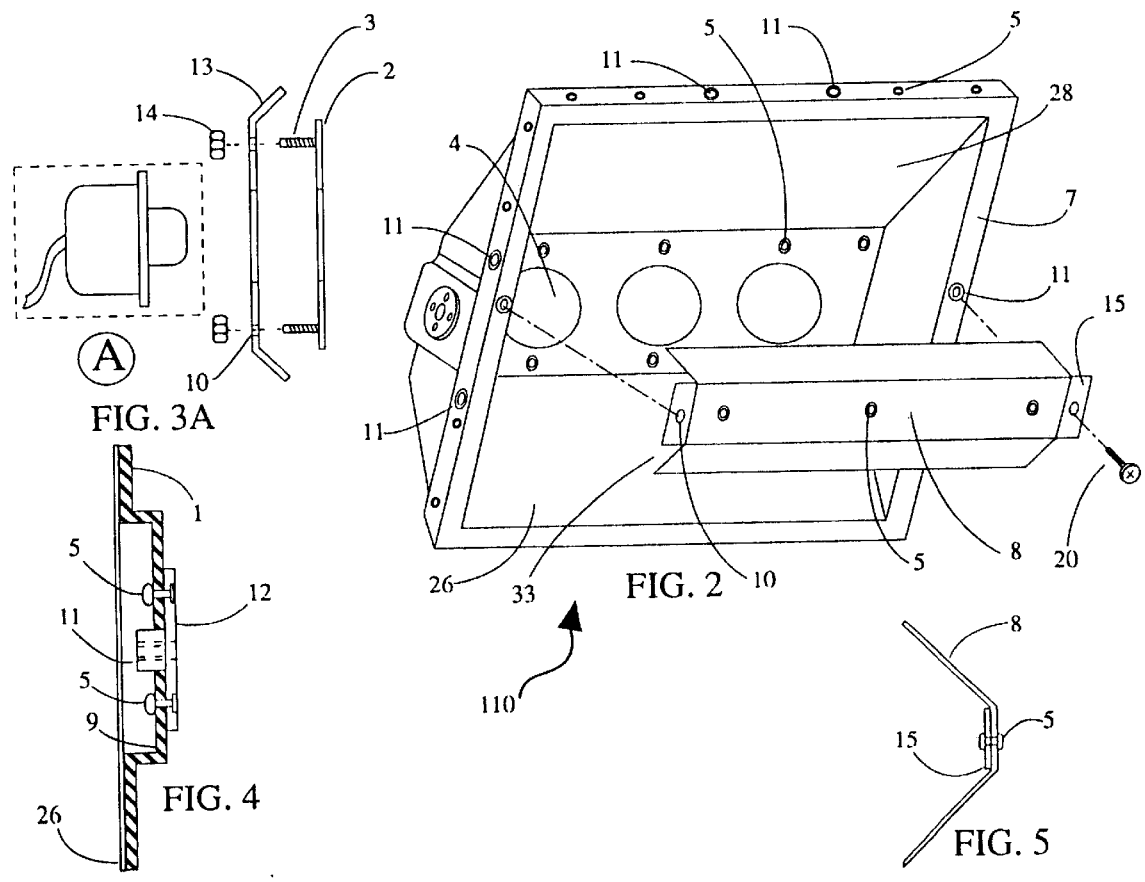

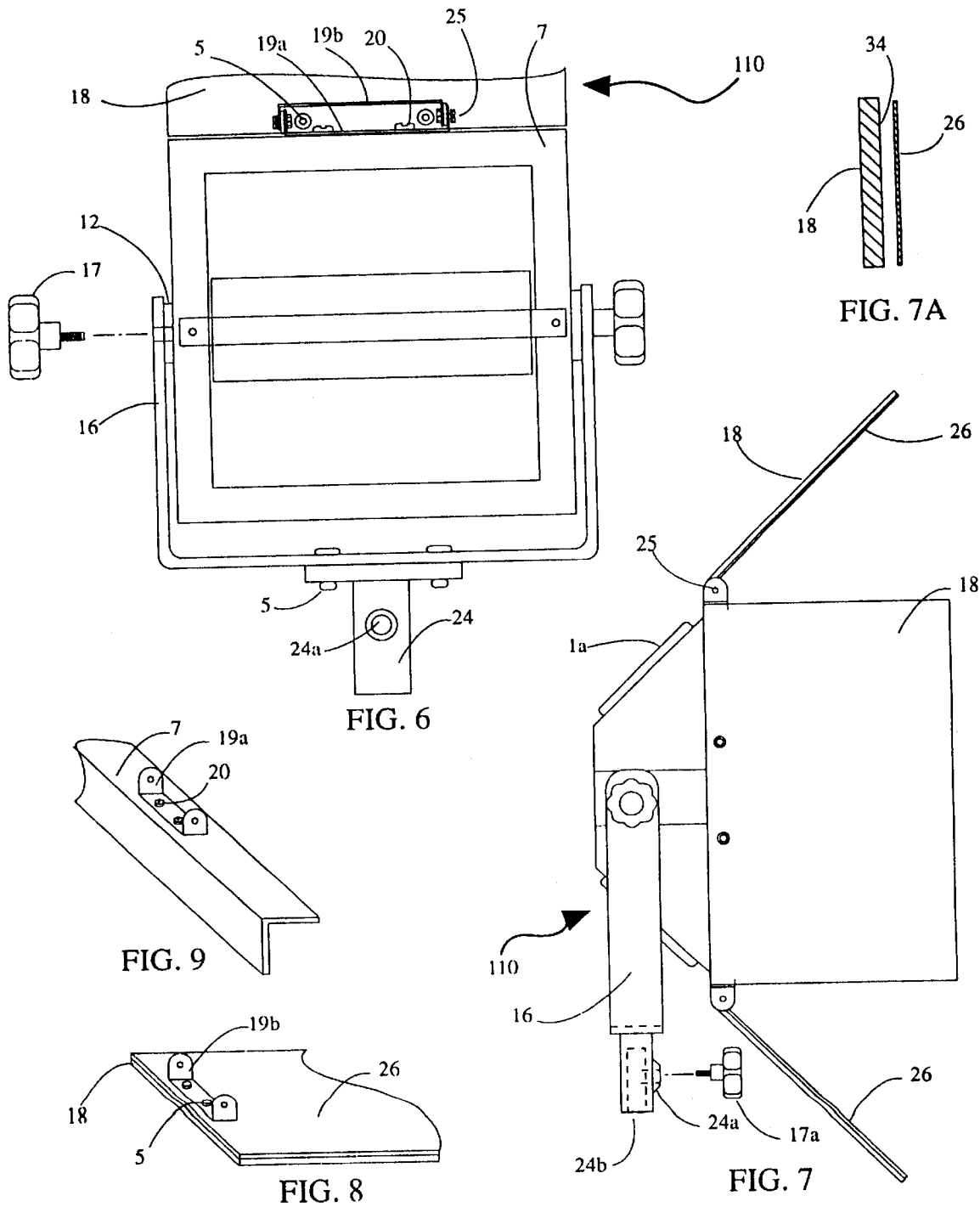

LIGHT MODIFIER

CROSS REFERENCE TO RELATED APPLICATION

Applicant claims the benefit of his prior provisional application Ser. No. 60/102,183 filed Sep. 28, 1998.

BACKGROUND

1. Field of Invention

This invention relates to a light weight light modifier having a single-piece molded housing capable of supporting several strobe-light heads, tungsten lights, HMI lights, barndoors, filter holders, diffusers, and other accessories as well as being adaptable for mounting a camera for shadow free photography.

2. Description of Prior Art

One of the most important aspects of photography is the ability to control light. Any device used to control light, its intensity or direction, is called a light modifier. Those used in photography are broadly classified as follows:

a) Bounce umbrellas (modifiers) having reflective undersurface ranging from white to gold or silver metallic. The light source is reversibly mounted under the concave center of the open umbrella bouncing the light back from the reflective surface.

The problem associated with the bounce umbrella is the difficulty in attaching filters for color correction or the inability to attach barndoors or other directional light control devices.

Some of the better known umbrella designs are made and marketed by Lowell, Photogenic, Profoto, and other quality manufacturers.

a) Parabolic and ellipsoidal reflectors. These basic reflectors (modifiers) are usually employed with a single light source. The light bulb or a strobe light is positioned near the base of the reflector, facing the opening. The light reflects from the sides of the reflector to the area being illuminated. This type of reflector is usually made from light weight aluminum by metal spinning. Ideally the inside surface of the reflector is made of highly polished material, preferably with a textured pattern to diffuse the light and avoid hot spots.

However, because the spinning process forces the textured surface against a tool, much of this highly reflective surface is damaged, causing less effective, uneven illumination. Typical parabolic and ellipsoidal reflectors are made and marketed by Speedotron, Norman, Profoto, and other quality manufacturers.

b) Soft boxes. These modifiers are made of soft, light weight fabric, supported by a framework of rods. The inside of the box is typically lined with reflective fabric and the front portion is covered with a translucent fabric. The outer-shell sides and rear portion are covered with a black fabric. The light source is mounted on the back of the box, facing the translucent front panel. The soft boxes typically employ either a single strobe light or a continuous light source, usually quartz halogen.

This light weight design is usually attached to a light fixture as an accessory and has no independent means for mounting on a stand. Due to its soft design, it has no hard points onto which accessories such as bardoors or filters can be readily added. Well-known soft boxes designs are made and marketed by Lowell, Photogenic, Profoto, Chimera, Westcott, and other quality manufacturers.

c) Fresnel lens equipped light modifiers deliver a direct light beam, which feathers from a hard center toward a softer edge. These lights are typically made with a metal housing and have brackets for attaching accessories such as barndoors, diffusers, and filter holders.

While this light modifier successfully projects a highly controllable light beam, it is limited to a single-point light source, either a strobe or a light bulb. Only a more powerful strobe unit or a higher wattage bulb can gain additional light.

Makers of fresnel lens equipped lights include Mole-Richardson Co., Profoto, Admagic, Sinar Bron, Elinchrom, and other quality manufacturers.

SUMMARY OF THE INVENTION

The present invention represents an improvement in the field of studio or location lighting for photographers. The design is a rugged, light weight package, made of high density plastic housing and highly reflective inside panels which enable multiple lights, either strobe or continuous lights, to be utilized and their collective output directed to the area being illuminated.

The development of a of light modifier combining multiple light sources to boost overall light output, and delivering a more even light, represents a significant improvement in photographic lighting and would satisfy a long-felt need of studio or location photographers.

While the above mentioned models all have their place in photographic lighting, the present invention offers advantages for studio and location lighting not found in the above described light modifiers. Several objects and advantages of the present invention are:

a) to enable multiple lights, either strobe based, or continuous source, to be mounted onto a single light-modifier to obtain a maximum, uniform, light from their collective output;

b) to provide photographers with a light-modifier, which accepts variety of commercially available lights which, are easily mounted with adapter plates;

c) to provide an economical light-modifier with a single-piece, rigid, platform capable of supporting barndoors, filters, and diffusers, and having a pivotable yoke for mounting on a stand;

d) to provide a single-piece molded housing which forms a rigid platform allowing the inside of the housing to be lined with reflective panels for maximum light reflection without distorting their intended shape.

e) to provide a method for mounting a camera for shadow free lighting.

Further objects and advantages of the invention are to provide a light modifier equipped with adjustable barndoors whose inner surfaces are lined with reflective material for further light-path manipulation. By reflecting the light from upper bardoor reflectors, foreground illumination can be extended or, conversely, the opposite effect can be achieved when the light is reflected from the lower reflector. Similar effects are achieved by manipulating the side reflectors.

The inner surface of the barndoors is also covered with the similar reflective material. The single-piece-molded housing can be made with complex geometry, difficult or impossible to fabricate from metal. The housing comes off the mold, dimensionally stable and needs no painting.

By removing the baffle plate a camera mount can be attached behind the center hole for camera placement. In this configuration the unit is turned into a shadowless "ring" light.

The yoke-supported light modifier can be mounted on conventional light stand or suspended, inverted, from a boom-arm stand or a ceiling mount.

The rigid platform makes it easy to attach filters, diffusers, and other accessories for added light control.

An appreciation of the other aims and objectives of the present invention and a more complete and comprehensive understanding of it may be achieved by referring to the accompanying drawings and by studying the following description of the preferred embodiment.

BRIEF DESCRIPTION OF THE DRAWINGS.

FIG. 1 is a perspective rear view of the light modifier partially disassembled without the frame.

FIG. 2 is a perspective front view of the light modifier partially disassembled.

FIG. 3a shows an exploded side view relationship of the mounting plate and the adapter plate.

FIG. 4 shows a side view of a yoke adapter along the lines shown on FIG. 1.

FIG. 5 is a side view of the baffle plate.

FIG. 6 is a front view the light modifier with only the top barndoor shown for clarity.

FIG. 7 is a side view of the light modifier with barndoors attached.

FIG. 7A is an exploded side view of the barndoors.

FIG. 8 shows the attachment of the swivel bracket to the barndoor.

FIG. 9 shows the attachment of the swivel bracket to the frame.

DESCRIPTION OF PREFERRED EMBODIMENT

Figures 10, 11A, 11B:
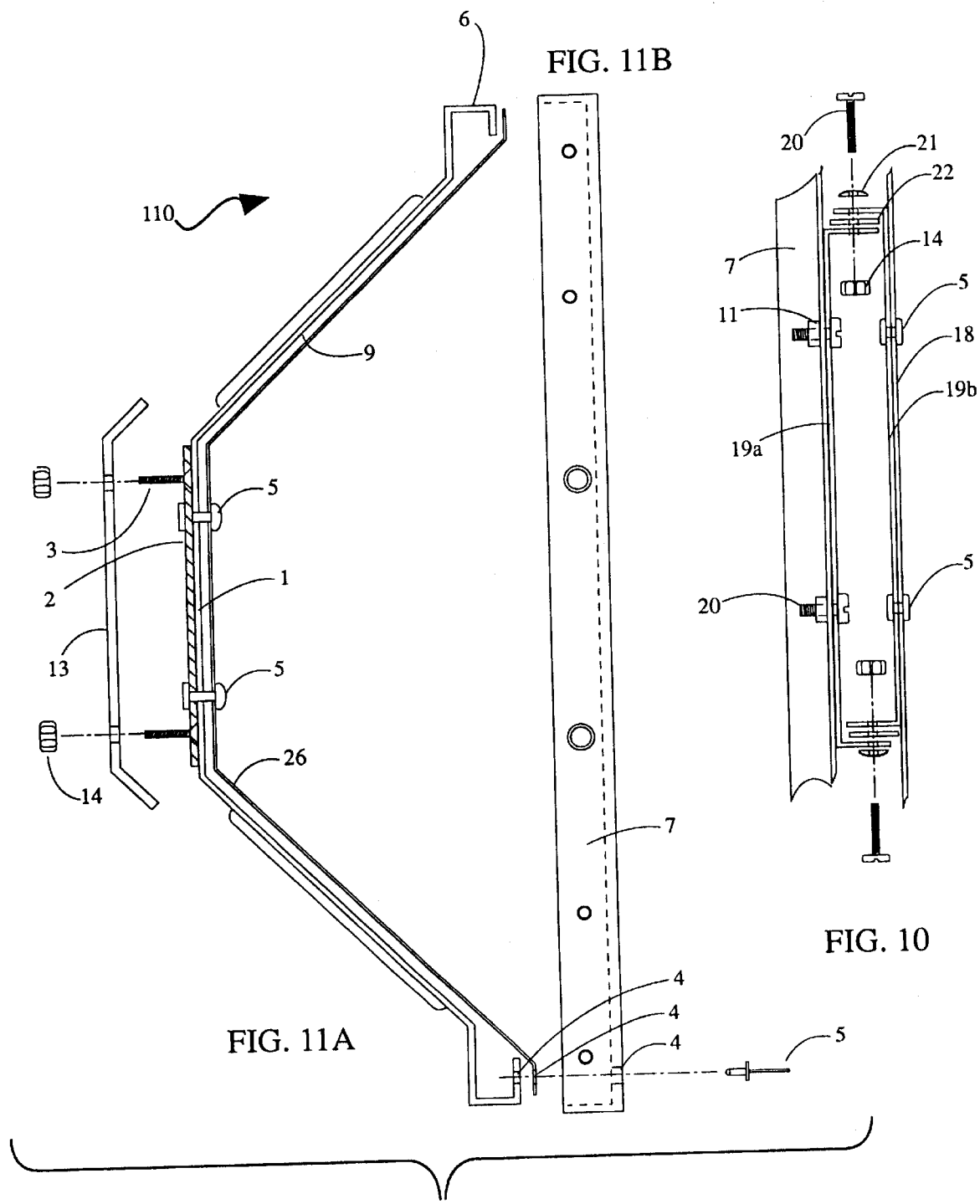
FIG. 10 is an edge view of the swivel brackets and their connector parts.
FIG. 11A is a cross sectional partially disassembled view of the light modifier along the lines shown 11A—11A on FIG. 1.
FIG. 11b is a side view of the frame.

FIG. 1 Shows a perspective rear view of the light modifier 10 with its main components: the housing 1; the reinforcing ribs 1a; the mounting plate 2; the self-clinching, threaded studs (PEM nuts) 3; the lamp-head openings 4; the rivets 5; the rim 6; and the yoke adapter 12. The housing 10 is preferably rotation molded of plastic and a metal mounting plate 2 is attached to the outer side 1 with rivets 5. The yoke adapter 12 is attached onto the modifier 110 with rivets 5. See FIG. 4 also, for details. The adapter plate 13 attaches to the mounting plate 2 through studs 3, and has openings 4 for lights C or camera lens D.

FIG. 2 Shows a perspective front view of the light modifier 110 with its components: the reflector 26; the frame 7; the removable baffle 8; the rivets 5; the support bar 15; the holes 10; the PEM nuts 11. A metal frame 7 is fastened with rivets 5 to the rim 6, which is then no longer visible. A baffle support bar 15 is attached to the baffle 8 with rivets 5. The baffle 8 is removably attached to the frame 7 with screws 20. The PEM nuts 11 provide the connection for attaching the removable barndoors 18 to the frame 7. See FIGS. 8, 9, and 10, also.

FIG. 3 is an edge view of the mounting plate 2; the adapter plate 13; threaded nuts 14; and a light source indicated by encircled C. The self-clinching studs 3 protrude through the holes 10 on the adapter plate 13 and are fastened with the nuts 14, for a quick connect/disconnect.

FIG. 4 Is a cross sectional side view showing the relationship between the housing 1; yoke adapter 12; rivets 5; PEM nut 11 pressed into yoke adapter 12; reflective sheet 26 attached against the inner-side housing 9. The rivets 5 are inserted from the outside and mushroom against the housing inner side 9.

FIG. 5 Is an edge view of the baffle plate 8; the support bar 15; and rivet 5. The baffle 8 is made of polished and textured aluminum, and is permanently riveted to the support bar 15 by rivets 5.

FIG. 6 is a front view of the light modifier 110 showing a barndoor 18 attached to a swivel bracket 19b with rivets 5. The opposite matching bracket 19a is detachably fastened to the frame 7 with screws 20. The barndoors 18 swivel at pivot points 25. The yoke 16 is attached to the yoke adapter 12 with knob 17. The stand adapter 24 has a threaded hole 24a for mounting on a stand (not shown) and is permanently attached to the yoke 16 with rivets 5.

FIG. 7 Is a side view of the light modifier 110. The barndoors 18 swivel at pivot points 25. The reflective sheet 26 is permanently bonded to the inner surface 34 of barndoors 18, with heat mounted or cold bonded application. Knob 17a screws through threaded insert 24a extending into hole 24b for attaching the yoke 16 to a stand.

FIG. 7A is an exploded view of the barndoor 18 showing how the liner 26 is attached to the inner side 34 of the barndoor 18.

FIG. 8 shows the swivel bracket 19b permanently attached to the barndoor 18, on the side covered with reflective sheet 26, by rivets 5. See FIG. 10, also.

FIG. 9 Shows the opposite swivel bracket 19a, removably attached to the frame 7 with screws 20. See FIG. 10, also.

FIG. 10 Shows the connection between the barndoors 18 and the frame 7. The edge view shows the barndoor 18; the swivel brackets 19a and 19b and the frame 7. The threaded nut 14, the screw 20, the spring washer 21, and the fiber washer 22 provide a method of fastening these components together with cushioning and controllable resistance between the brackets 19a and 19b. The screw 20 is inserted through the spring washer 21, through bracket 19a, through fiber washer 22, through matching bracket 19b, and into the nut 14. Bracket 19a is removably attached to frame 7, and threaded into self clinching fastener 11, with screws 20, while the barndoor 18 is permanently fastened to bracket 19b with rivets 5.

FIG. 11A Shows a cross sectional partially exploded view of the light modifier 110. The mounting plate 2 is riveted against the housing I with rivets 5 through reflector liner 26aβ. The adapter plate 13 is removably attached over the mounting plate 2 with nuts 14 which are fastened into self clinching studs 3. Reflective sheet 26 is formed to follow the inner contours of the housing 1 and attached to the rim 6 at the time frame 7 is secured with rivets 5.

FIG. 11B Illustrates a side view of the frame 7. When attached to the rim 6 with rivets 5 through holes 4, the frame 7 encases and secures the inner liner reflector sheet 26 to the rim 6.

Figure 12:
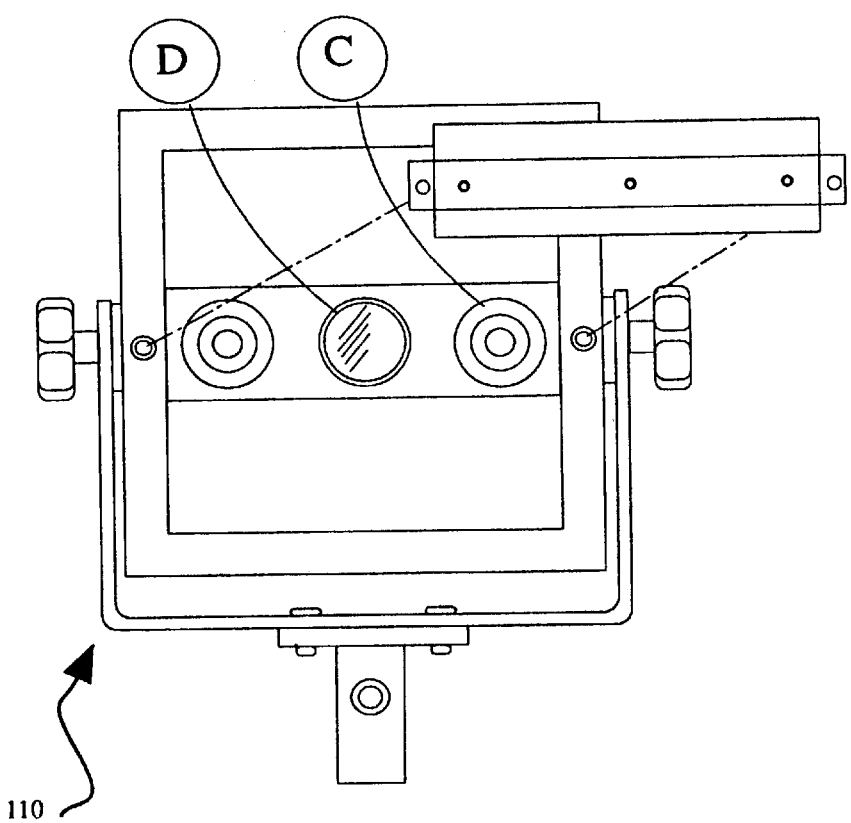
FIG. 12 shows a camera lens mounted onto the center hole. The baffle plate must be removed before use.

FIG. 12 Shows a front view of the modifier 110 with the baffle plate 8 removed, enabling the middle hole 4 to be used for camera lens D. Used in this fashion, the two lights C, are located on either side of the lens D to provide shadowless illumination.

Figure 13:
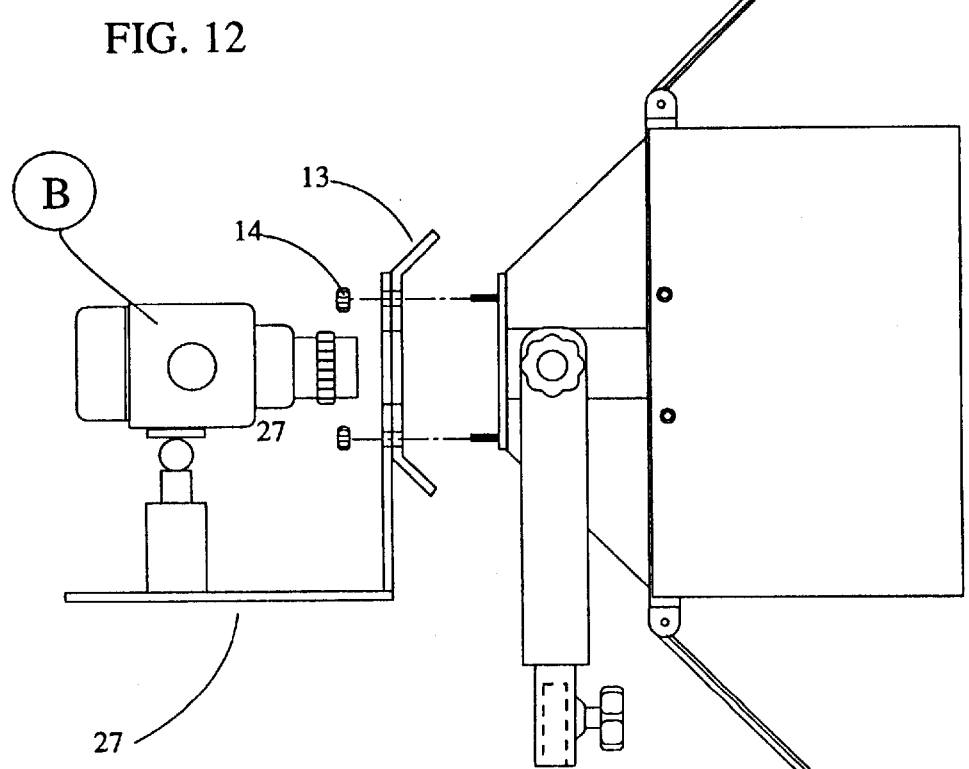
FIG. 13 is a side view showing a camera mounting method.

FIG. 13 Shows a platform 27 for a camera, represented by circled B, and is attached to the adapter plate 13, which can then be fastened to the mounting, plate 2 with nuts 14.

The light modifying apparatus 110 of this invention has a housing 1 of roughly trapezoidal cross section. The housing 1 has an open larger parallel side 28 a smaller parallel side 29 and preferably three in line, spaced apart holes 4 cut into the smaller parallel side 29. The open larger parallel side 28 and the smaller parallel side 29 are approximately the same length. The housing 1 also has angled faces 30 joining the parallel sides 28, 29 along their length and end faces 31 joining the parallel sides 28, 29 perpendicularly at their ends 32. The in line, spaced apart holes 4 are designed to receive a variety of lamp heads C or lenses D.

At the perimeter of the larger parallel side 28 of the housing 1 is flange 6. Preferably, the flange 6 is integral with the housing 1. Preferably the integral housing 1 and flange 6 are made of plastic by molding. As is typical for parts made of molded plastic, strength is gained by incorporating integral ribs 1a.

An open frame 7, preferably made of metal, ol approximately the same size as the flange 6, is attached to the flange 6. The frame 7 provides a rigid platform for attaching diffusers (not illustrated), filters (not illustrated) and barndoors 18 to the invention. If the frame is made of magnetic material, filters, and diffusers can simply the kept in place with magnets (not illustrated). Barndoors 18 can be pivotally attached to the rigid frame 7 with detachable pivoting mechanisms as described above. The insides of the barndoors 18, i.e. the sides that face in the same direction as the liner 26a (see below) are lined with a light reflective material 26.

A light baffle 8, of roughly trapezoidal cross section having an open larger parallel side 33 is attached with its open larger parallel side 33 facing the smaller parallel side 29 of the housing 1, across this rigid frame 7. The light baffle 8 is made of a light reflective material 26. The length of the light baffle 8 is the same as the length of the larger parallel side 28 of the housing 1. The width of the light baffle 8 is approximately the same as the width of the smaller parallel side 29 of the housing 1. The light baffle 8 is aligned so that its length is aligned with the in line, spaced apart holes 4.

A yoke 16 is attached to the end face 31 for adjustably mounting the housing 1 and thus the whole light modifier 110 on a stand.

A liner 26a of a size and shape to fit snugly inside the housing 1 made of light reflective material 26 is attached to the inside 9 of the housing 1. The liner 26a has three holes 4 cut into it of the same size as and located to be in registration with those in the smaller parallel side 29 of the housing 1.

An adapter plate 13, preferably made of metal, is attached to the rear of the smaller parallel side 29 of the housing. The adapter plate 13 is approximately the same size as the smaller parallel side 29. It also has a plurality of holes 4 of the same size as and located to be in registration with those in the smaller parallel side 29. The adapter plate 13 is provided for as a platform for mounting of the lamp heads C or lenses D through the holes 4 in the adapter plate 13 the smaller parallel side 29 and the liner 26a.

Preferably the light reflective material 26 is an aluminum sheet with a small hammered pattern such as Miro 9 Stucco G, manufactured by Alanod of Ennepetal, Germany.

REFERENCE NUMERALS IN DRAWINGS.

110 Light
1 Housing
2 Mounting plate
3 Self-clinching studs
4 Opening for lamp head
5 Rivets, generic
6 Rim
7 Fraine
8 Baffle
9 Housing, inner side
10 Hole, generic
11 Self clinching nuts (AKA. PEM nuts)
12 Yoke adapter
13 Adapter Plate
14 Nuts, threaded, generic
15 Support bar
16 Yoke
17 Knob for pivotable yoke
17a Knob for attaching to stand
18 Barndoors (AKA. louvers)
19a Bracket attached to name
19b Bracket attached to Barndoor
20 Screw, generic
21 Spring washer
22 Fiber washer
24 Stand adapter
24a Threaded hole
24b Stand-mounting hole
25 Pivot point
26 Reflector sheet/liner, generic
26a Liner
27 Camera mounting platform
28 Open larger parallel side of housing
28 Shorter parallel side of housing
30 Angled faces
31 End faces
32 Ends of parallel sides
33 Open large parallel side of baffle
34 Inside of barndoors Accordingly the objects and advantages of this invention are:

To replace a heavy metal housing, currently employed in the industry, with a light weight plastic housing offering weight savings and cost reduction. The weight savings make it easier and more cost effective to transport the unit to a location.

Improve structural integrity of the housing by incorporating reinforcing ribs in the molding process otherwise costly or impossible to duplicate in an all-metal housing.

Eliminating rust problems and painting; the plastic material is available in variety of colors. The molded one-piece unit makes it a convenient, strong, platform for attaching frames, reflective panels, and hard-points for accessories. The molded surface is largely impervious to scratches and requires no additional maintenance, touch up, or painting.

The light modifier 110 has been described with a reference to a particular embodiment. However, it should be obvious to those skilled in the art to which this invention pertains, that other modifications and enhancements can be made without departing from the spirit and scope of the claims that follow.

What is claimed is:

1. A light modifying apparatus comprising:
   a. a housing of roughly trapezoidal cross section, having an open larger parallel side, a smaller parallel side and a plurality of in line, spaced apart holes in said smaller parallel side; said open larger parallel side and said smaller parallel side being of approximately equal length; said housing also having angled faces joining said parallel sides along said length and end faces joining said parallel sides perpendicularly at their ends; said in line, spaced apart holes adapted for receiving lamp heads and lenses;
   b. a flange at the perimeter of said larger parallel side of said housing;
   c. a rigid frame, of approximately the same size as said flange, attached to said flange; said frame having an opening through it of approximately the same size as said open larger parallel side of said housing;

d. a light baffle, of roughly trapezoidal cross section having an open larger parallel side, attached with its open larger parallel side facing the smaller parallel side of said housing, across said rigid frame; the length of said light baffle being the same as the length of said parallel sides of said housing; the width of said light baffle being approximately the same as the width of the smaller parallel side of said housing; the length of said light baffle being aligned with said in line, spaced apart holes; said light baffle being made or a light reflective material;

e. yoke means attached to said end faces for adjustably mounting said housing on a stand;

f. a liner of a size and shape to fit snugly inside said housing, and having a plurality of holes of the same size as and located to be in registration with those in said smaller parallel side of said housing; said liner being made of light reflective material and attached to the inside of said housing; and g. an adapter plate; said adapter plate being approximately the same size as said smaller parallel side and having a plurality of holes of the same size as and located to be in registration with those in said smaller parallel side; said adapter plate being adapted for mounting of said lamp heads or lenses through said holes in said adapter plate, said smaller parallel side and said liner; and h. means for detachably attaching said adapter plate to said a rear of said smaller parallel side.

2. A light modifying apparatus as claimed in claim 1 in which said housing and flange are integral.

3. A light modifying apparatus as claimed in claim 2 in which said housing and flange are molded plastic.

4. A light modifying apparatus as claimed in claim 3 in which said housing incorporates a reinforcing rib.

5. A light modifying apparatus as claimed in claim 3 in which said light reflective material is a hard aluminum sheet with a small hammered pattern.

6. A light modifying apparatus as claimed in claim 1 in which said rigid frame is metallic.

7. A light modifying apparatus as claimed in claim 6 in which said rigid frame is magnetic.

8. A light modifying apparatus as claimed in claim 1 in which said light reflective material is a hard aluminum sheet with a small hammered pattern.

9. A light modifying apparatus as claimed in claim 1 further comprising a barn door pivotally attached to said rigid frame and a liner of light reflective material attached to the inside of said barn door.

10. A method of manufacturing a light modifying apparatus comprising the steps of:

a. fabricating a housing of roughly trapezoidal cross section, having an open larger parallel side, a smaller parallel side, and a flange at the perimeter of said larger parallel side; said open larger parallel side and said smaller parallel side being of approximately equal length; said housing also having angled faces joining said parallel sides along said length and end faces joining said parallel sides perpendicularly at their ends;

b. cutting a plurality of in line, spaced apart holes in said smaller parallel side; said in line, spaced apart holes being adapted for receiving lamp heads and lenses;

c. fabricating a rigid frame, of approximately the same size as said flange; said frame having an opening through it of approximately the same size as the large parallel side of said housing;

d. fabricating a light baffle, of roughly trapezoidal cross section having an open larger parallel side; the length of said light baffle being the same as the length of said parallel sides of said housing; the width of said light baffle being approximately the same as the width of the smaller parallel side of said housing; said light baffle being made of a light reflective material;

e. fabricating a yoke means for adjustably mounting said housing on a stand;

f. fabricating a liner of a size and shape to fit snugly inside said housing said liner being made of light reflective material;

g. cutting a plurality of holes in said liner of the same size as and located to be in registration with those in said smaller parallel side;

h. fabricating an adapter plate; said adapter plate being approximately the same size as said smaller parallel side;

i. fabricating mounting plate means for detachably attaching said adapter plate to the rear of said smaller parallel side;

j. cutting a plurality of holes of the same size as and located to be in registration with those in said smaller parallel side; said adapter plate being adapted for mounting of said lamp heads or lenses through said holes in said adapter plate said smaller parallel side and said liner;

k. attaching said liner to the inside of said housing;

l. attaching said rigid frame to said flange;

m. attaching said light baffle with its open larger parallel side facing the smaller parallel side of said housing, across said rigid frame with the length of said light baffle aligned with said in line, spaced apart holes;

n. attaching said yoke means to said end faces;

o. attaching said mounting plate means to the rear of said smaller parallel side; and p. attaching said adapter plate to the rear of said smaller parallel side.

11. A method of manufacturing a light modifying apparatus as claimed in claim 10 in which said step of fabricating said housing is accomplished by molding.

12. A method of manufacturing a light modifying apparatus as claimed in claim 11 in which said light reflective material is a hard aluminum sheet with a small hammered pattern.

13. A method of manufacturing a light modifying apparatus as claimed in claim 10 in which said light reflective material is a hard aluminum sheet with a small hammered pattern.

14. A method of manufacturing a light modifying apparatus as claimed in claim 10 further comprising the step of incorporating a reinforcing rib in said housing.

15. A method of manufacturing a light modifying apparatus as claimed in claim 10 in which said rigid frame is metallic.

16. A method of manufacturing a light modifying apparatus as claimed in claim 15 in which said rigid frame is magnetic.

17. A method of manufacturing a light modifying apparatus as claimed in claim 10 further comprising the steps of:

a. fabricating a barndoor;

b. fabricating a liner of light reflective material;

c. attaching said liner to the inside of said barndoor; pivotally attaching said barn door to said rigid frame so that said liner faces in a same direction as said reflector when said barn door is pivoted from 90 to 180 degrees away from said housing.

\* \* \* \* \*